United States Patent
Huang

(10) Patent No.: US 7,374,148 B2
(45) Date of Patent: May 20, 2008

(54) CONTROL SYSTEM FOR FLOW ADJUSTING VALVE

(76) Inventor: I-Hua Huang, 3F1, No.811, Pei-Ann Road, Taipei City (TW)

( * ) Notice: Subject to any disclaimer, the term of this patent is extended or adjusted under 35 U.S.C. 154(b) by 191 days.

(21) Appl. No.: 11/358,072

(22) Filed: Feb. 22, 2006

(65) Prior Publication Data

US 2007/0194259 A1    Aug. 23, 2007

(51) Int. Cl.
*F16K 31/02* (2006.01)
(52) U.S. Cl. .............................. 251/129.11; 251/129.04
(58) Field of Classification Search ........... 251/129.11, 251/129.12, 129.13, 129.04
See application file for complete search history.

(56) References Cited

U.S. PATENT DOCUMENTS

| | | | | |
|---|---|---|---|---|
| 5,517,966 A | * | 5/1996 | Kanazawa et al. .......... 123/396 |
| 5,856,743 A | * | 1/1999 | Juniman ................. 324/207.25 |
| 6,435,169 B1 | * | 8/2002 | Vogt ....................... 123/568.23 |
| 7,239,131 B2 | * | 7/2007 | Halder et al. .......... 324/207.21 |

* cited by examiner

*Primary Examiner*—John K. Fristoe, Jr.
(74) *Attorney, Agent, or Firm*—Bacon & Thomas, PLLC

(57) ABSTRACT

A control system for a flow adjusting valve, it uses rotation of a motor as the power force to move a terminal output axle and then to change the openness of the latter; and further includes a magnet and a magnetic inductive element in opposition to the magnet to count the number of rotating turns of the terminal output axle to obtain different fed back signals, thus the openness of the flow adjusting valve can be known; clutch gears are provided between the motor and the terminal output axle, when the clutch gears generate a getting off action, the maximum and the minimum states of the openness of the flow adjusting valve can be known by rotating forwards and backwards of the motor, this can be a reference method to have the frequency signals of the control system for the flow adjusting valve set zero for correction.

9 Claims, 7 Drawing Sheets

CONTROL SYSTEM FOR FLOW ADJUSTING VALVE

BACKGROUND OF THE INVENTION

1. Field of the Invention

The present invention is related to a control system for a flow adjusting valve, and especially to a flow control system used for a combustor to do gas flow adjusting and control, the system can even do combusting gas-flow adjusting on a combustor with two lines of fire to accurately control the power of the fire on the combustor.

2. Description of the Prior Art

Conventional mechanical flow adjusting and control methods generally use linear sensors or variable resistors etc. to adjust and feed back signals of positions, the linear sensors always have the defects including wearing in using, inability of having long life of use and complication of their control systems, as well as hardness in simultaneous correctly controlling the flow adjusting valves having two outlets each.

SUMMARY OF THE INVENTION

The Technical Problem to be Solved

Although flow adjusting devices in connection with the above stated conventional mechanical flow adjusting and control methods can use stepped motors as driving elements of the flow adjusting devices, by the fact that driving current and working voltage required for a stepped motor are larger and thereby the stepped motor consumes more power, for those control devices using dry batteries as their power sources, for instance: power sources in combustors including gas water-heaters, gas heaters etc. for operating the flow adjusting valves and for operation for ignition and for operation of control systems often encounter difficulty of supplying, i.e., additional electric power is hard to be provided for driving stepped motors; particularly when a combustor has been provided therein with a lot of electronic instruments, its problem of electricity consumption often becomes the largest problem in operation for a conventional mechanical flow adjusting device.

The Technical Measures for Solving the Problem

The present invention provides a control system for a flow adjusting valve with low electricity consumption for the purpose of rendering a combustor to have a built-in dry battery to directly provide electric power for the control system for the flow adjusting valve; thereby the combustor can be entirely controlled electronically to meet the requirement of industry.

The control system for a flow adjusting valve of the present invention acts on a flow adjusting mechanism to change the openness of the flow adjusting valve and get the effect of flow adjusting; it is characterized in that: the control system for the flow adjusting valve uses rotation of a D.C. low power motor as the power force to get the openness of the flow adjusting mechanism; rotating of the motor is transmitted via several transmission gears and clutch gears to a terminal output axle, then the terminal output axle drives the flow adjusting valve to change the openness of the latter. The control system for the flow adjusting valve further includes a magnet synchronically rotating with the terminal output axle and a magnetic inductive element in opposition to the magnet to count the number of rotating turns of the terminal output axle to obtain different fed back signals, thus the openness of the flow adjusting valve can be known; at the maximum and the minimum states of the openness of the flow adjusting valve, the terminal output axle is unable to further rotate, the clutch gears generate a protective getting off action to render the magnetic inductive element unable to detect the fed back signals; the maximum and the minimum states of the openness of the flow adjusting valve can be known by rotating forwards and backwards of the motor, this can be a reference method to have the frequency signals of the control system for the flow adjusting valve set zero for correction.

Therefore, the control system for a flow adjusting valve of the present invention can be used to make adjustment of the openness of the flow adjusting mechanism through a D.C. low power motor, in other words, practicing of the present invention can save more electric power as compared with the conventional techniques, thereby it is more suitable to be used on combustors using a dry battery as their power sources.

And the flow adjusting valve can further include a valve plugging set driven by the terminal output axle to move linearly, the openness of the flow adjusting mechanism can be changed by the linear movement of the valve plugging set; the minimum state of the openness of the flow adjusting valve stated above means the state in which the valve plugging set seals the valve port provided for the flow adjusting valve. The valve plugging set can further include a flow micro-adjusting stick to cooperate with a minimum flow through hole provided in the flow adjusting valve, the flow micro-adjusting stick can move to and fro in the minimum flow through hole when the valve plugging set moves linearly, the flow micro-adjusting stick is provided thereon with different flowing through sections for the flow in order that different flow supplying effects can be provided when the flow micro-adjusting stick is moved in the minimum flow through hole, and this is the character of the valve plugging set.

One thing is worth mentioning, by virtue that the control system for a flow adjusting valve of the present invention can do accurate electronic control on the openness of the flow adjusting valve, the present invention is more suitable to be used on a combustor with two lines of fire, for example: the flow adjusting valve can further include a main valve port and a slow opening port, while the valve plugging set is provided thereon with a main valve plug and a slow valve plug respectively in cooperation with the main valve port and the slow opening port; when the main valve port is opened to a preset openness as the valve plugging set moves linearly, the slow valve plug will open to make the slow opening port open. By control of the control system for a flow adjusting valve of the present invention on the valve plugging set, the main valve port and the slow opening port can open accurately, thus their openness can be accurately controlled, and the main valve port and the slow opening port can be more beneficial to electronic or digital control.

Additionally, the above stated flow adjusting mechanism can simultaneously contain a plurality of flow adjusting valves connecting parallelly and operating independently as well as a master valve provided at an upstream end of these flow adjusting valves. The power of the master valve is also provided by a D.C. low power motor; and the control system for the flow adjusting valves of the present invention is used to integrate and control the flow adjusting valves and the master valve; when one of the flow adjusting valves is out of order and unable to be closed, the master valve can be closed to stop flowing of flow, such a technique is particularly applicable to combustors to prevent accident.

Comparison with the Conventional Techniques in Effect
1. The control system for a flow adjusting valve of the present invention can render a flow adjusting mechanism to get more accurate electronic control, thus openness of a flow adjusting valve provided in the flow adjusting mechanism can be more accurate to meet the requirement of a user.
2. When the control system for a flow adjusting valve of the present invention is used on a combustor, the fire power of the combustor can be further accurately controlled through control of flow; and a small-flow through hole can be used to supply gas for the combustor for combusting with the minimum fire power.
3. By virtue that the control system for a flow adjusting valve of the present invention can accurately electronically control openness of a flow adjusting valve, the present invention can be more suitable to be used on a combustor with two lines of fire.
4. The control system for a flow adjusting valve of the present invention is beneficial to entire electronic or digital control of a combustor; this can make the safety system and the control system more complete.
5. When the control system for a flow adjusting valve of the present invention contains a plurality of flow adjusting valves connecting parallelly and operating independently as well as a master valve provided at an upstream end of these flow adjusting valves, the control system for a flow adjusting valve of the present invention can integrate and control the flow adjusting valves and the master valve, so that the combustor can be used more safely.

The present invention will be apparent in its technical measures according to its technical measures after reading the detailed description of the preferred embodiment thereof in reference to the accompanying drawings.

DETAILED DESCRIPTION OF THE PREFERRED EMBODIMENT

Figure 1:
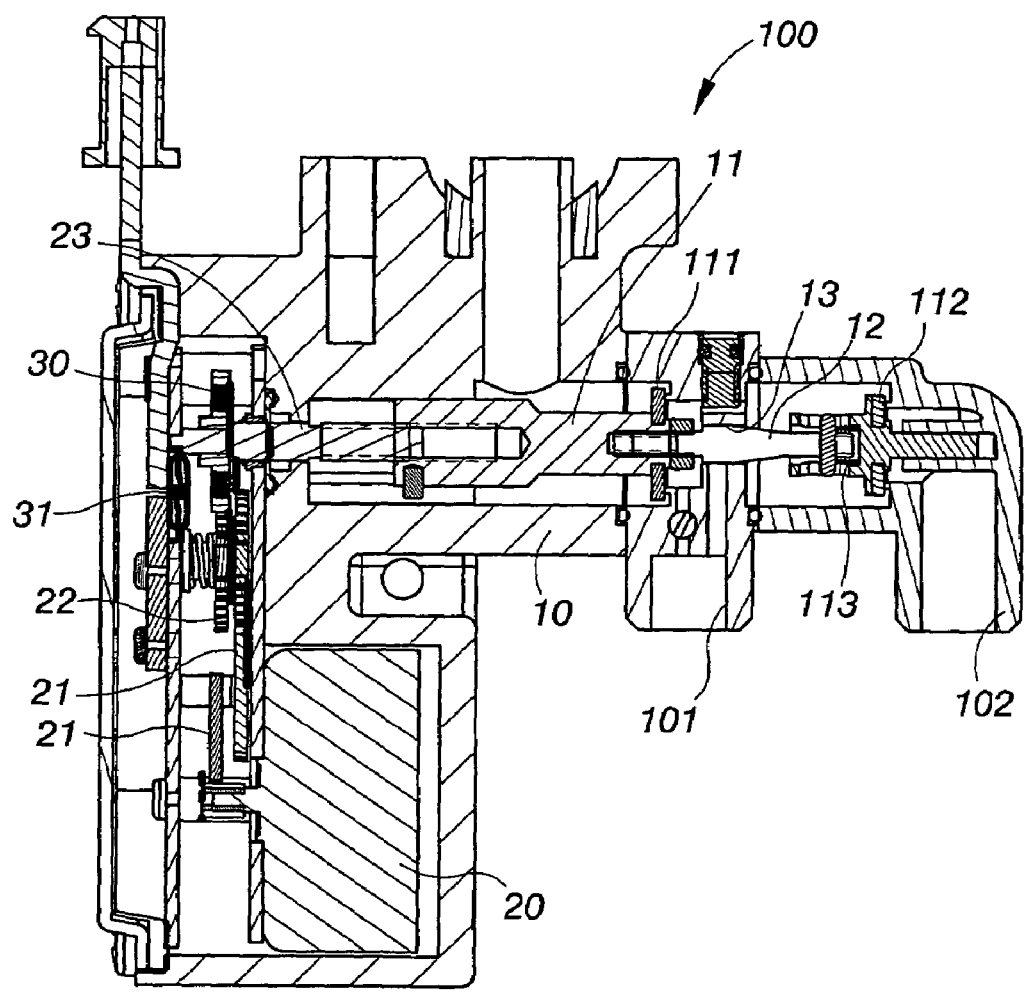
FIG. 1 is a sectional view of an embodiment of the present invention.
Figure 2:
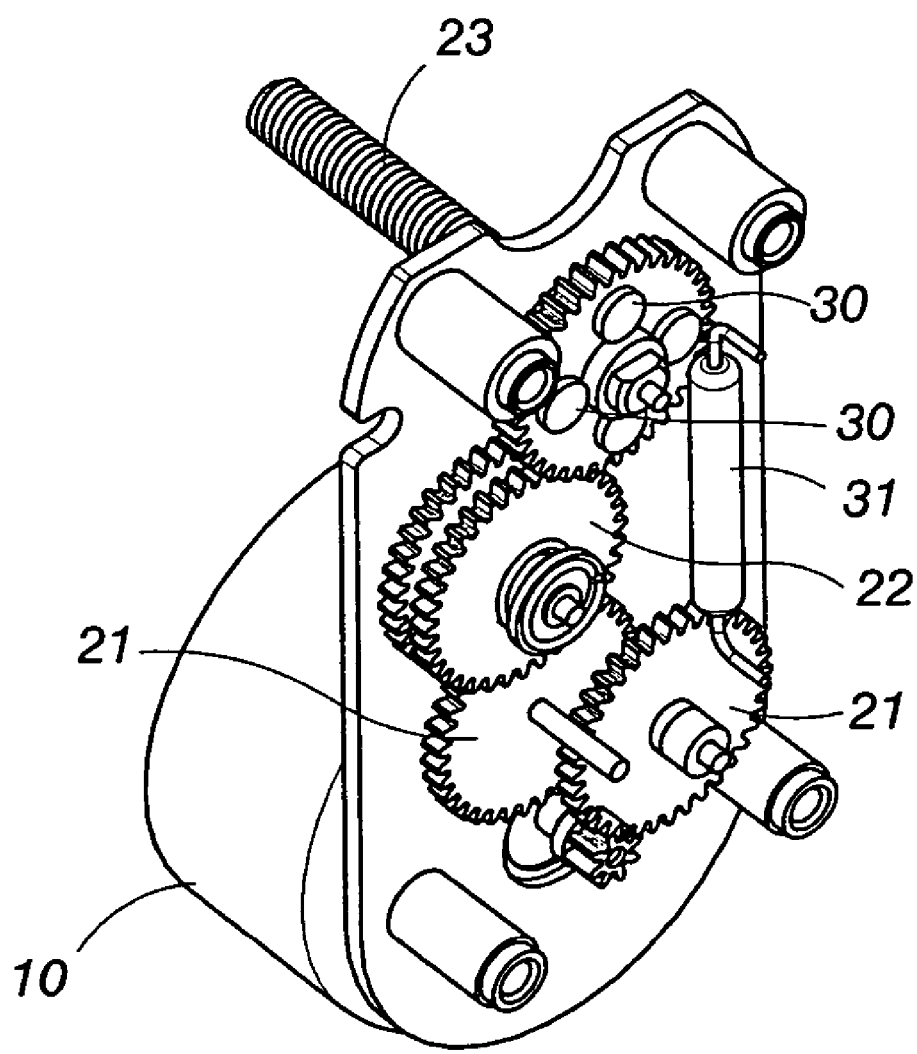
FIG. 2 is a perspective schematic view showing a motor transmitting structure of the embodiment of the present invention.

Referring to FIGS. 1 and 2 simultaneously, wherein FIG. 1 is a sectional view of an embodiment of the present invention, while FIG. 2 is a perspective schematic view showing a motor transmitting structure of the embodiment of the present invention, these drawings show that a control system for a flow adjusting valve 10 of the present invention is used on a flow adjusting mechanism 100 to make changing of the openness of the flow adjusting valve 10 provided in the flow adjusting mechanism 100, thus adjustment of flow can be effected.

The control system for the flow adjusting valve 10 uses rotation of a D.C. low power motor 20 as the power force to get the openness of the flow adjusting mechanism 100; rotating of the motor 20 is transmitted via several transmission gears 21 and clutch gears 22 to a terminal output axle 23, then the terminal output axle 23 drives the flow adjusting valve 10 to change the openness of the latter.

The control system for the flow adjusting valve further includes a magnet 30 synchronically rotating with the terminal output axle 23 and a magnetic inductive element 31 in opposition to the magnet 30 to count the number of rotating turns of the terminal output axle 23 to obtain different fed back signals, thus the openness of the flow adjusting valve 10 can be known.

At the maximum and the minimum states of the openness of the flow adjusting valve 10, the terminal output axle 23 is unable to further rotate, the clutch gears 22 generate a protective getting off action to render the magnetic inductive element 31 unable to detect the fed back signals; the maximum and the minimum states of the openness of the flow adjusting valve 10 can be known by rotating forwards and backwards of the motor 20, this can be a reference method to have the frequency signals of the control system for the flow adjusting valve set zero for correction.

And the flow adjusting valve 10 can further include a valve plugging set 11 driven by the terminal output axle 23 to move linearly, the openness of the flow adjusting mechanism 100 can be changed by the linear movement of the valve plugging set 11; the minimum state of the openness of the flow adjusting valve 10 stated above means the state in which the valve plugging set 11 seals the valve port provided for the flow adjusting valve 10.

The valve plugging set 11 can further include a flow micro-adjusting stick 12 to cooperate with a minimum flow through hole 13 provided in the flow adjusting valve 10, the flow micro-adjusting stick 12 can move to and fro in the minimum flow through hole 13 when the valve plugging set 11 moves linearly, the flow micro-adjusting stick 12 is provided thereon with different flowing through sections for the flow in order that different flow supplying effects can be provided when the flow micro-adjusting stick 12 is moved to and fro in the minimum flow through hole 13, for example: the flow micro-adjusting stick 12 is a cone that can make change of flow when the flow micro-adjusting stick 12 is moved to and fro in the minimum flow through hole 13.

By virtue that the present invention can do accurate control on the linear movement of the valve plugging set 11 through the operation of the D.C. low power motor 20 and cooperation of the magnet 30 with the magnetic inductive element 31, hence the present invention is more suitable to be used on a flow adjusting valve 10 having two outlets for a combustor with two lines of fire.

In practicing, the flow adjusting valve 10 can further include a main valve port 101 and a slow opening port 102, while the valve plugging set 11 is provided thereon with a main valve plug 111 and a slow valve plug 112 respectively in cooperation with the main valve port 101 and the slow opening port 102; when the main valve port 101 is opened to a preset openness as the valve plugging set 11 moves linearly, the slow valve plug 112 will open to make the slow opening port 102 open.

The slow opening port 102 provides a pushing force for the slow valve plug 112 by means of an elastic element 113, so that when the valve plugging set 11 moves linearly by driving of the D.C. low power motor 20, the main valve plug 111 will firstly do the action of changing openness; only when the displacement of the valve plugging set 11 reaches the limitation of extension of the elastic element 113, the slow valve plug 112 does changing of openness following the displacement of the valve plugging set 11; with this difference of strokes, an effect of slow opening can be obtained. Such an effect of slow opening is particularly applicable to a gas furnace with an inner and an outer line of fire, so that the inner and the outer lines of fire of the gas furnace can present a difference in getting fires which are supplied by stages. The flow adjusting valve 10 can be provided therein with a plurality of slow opening port 102 and slow valve plug 112 in equal number in pursuance of requirement of a user, in order that the flow adjusting valve 10 can supply gas for combustion by stages for a furnace with multiple lines of fire.

Figure 3:
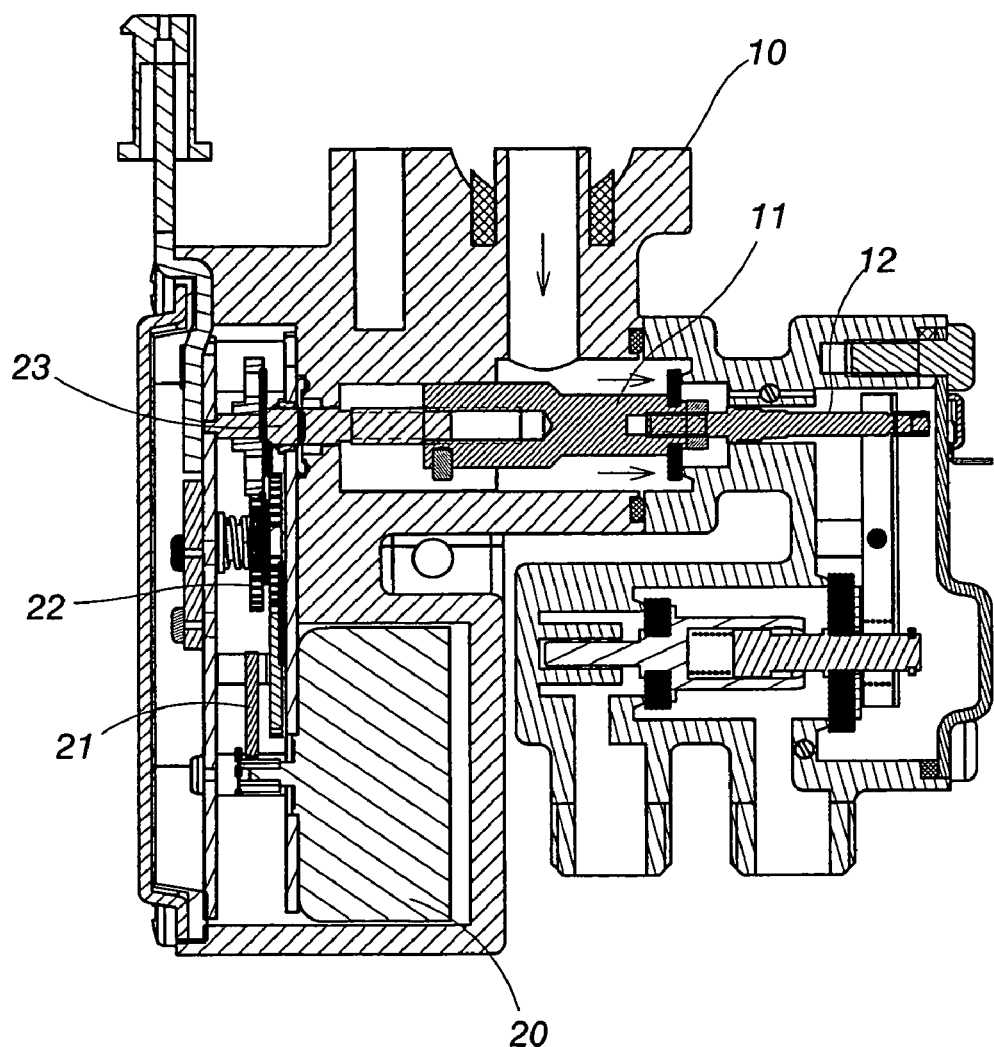
FIG. 3 is a sectional schematic view showing another flow micro-adjusting stick of the present invention.

As shown in FIG. 3 being a sectional schematic view showing another flow micro-adjusting stick of the present invention, the flow micro-adjusting stick 12 in practicing can be a cylinder with a step like variation, the step like variation makes gradual change of the flowing through caliber to result change of flow.

Figure 4:
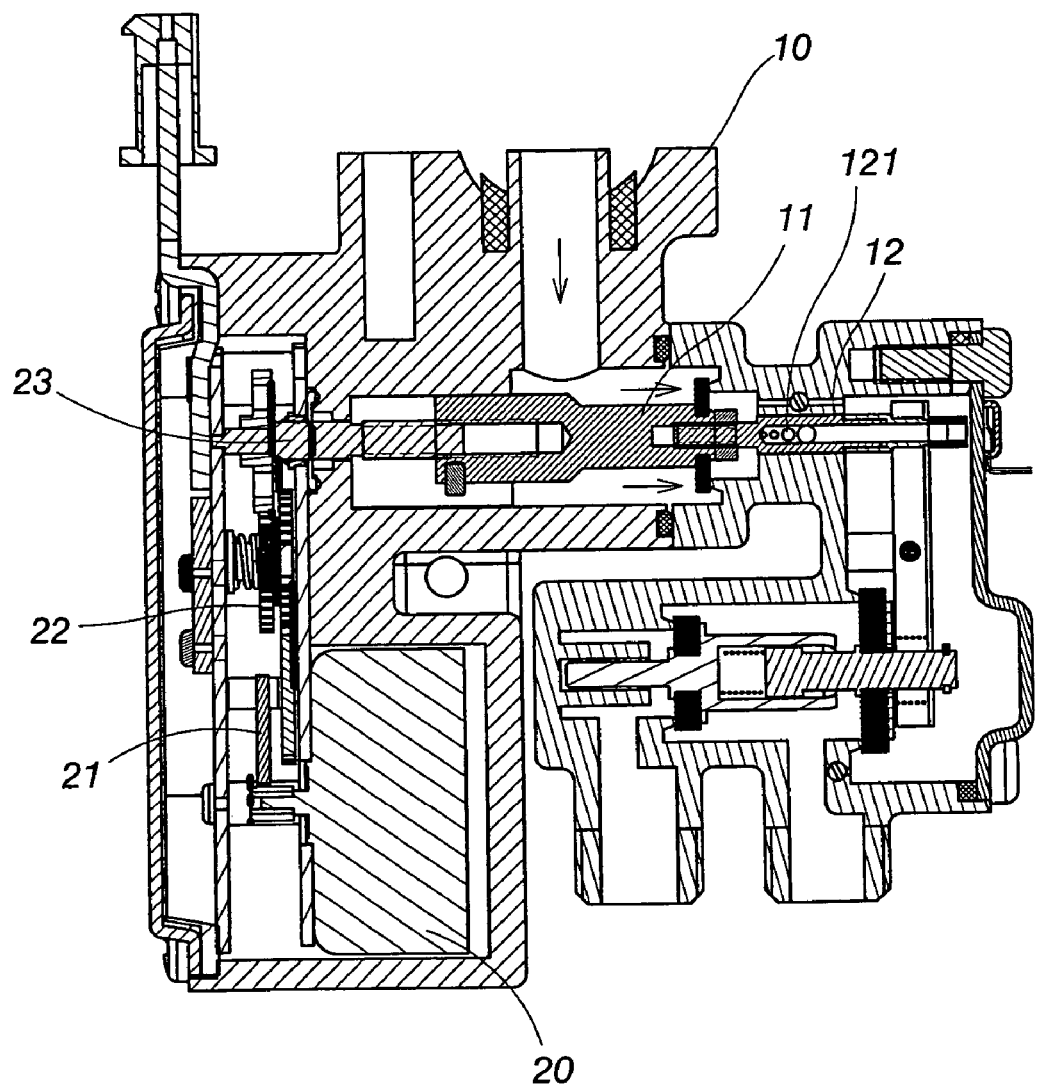
FIG. 4 is a sectional schematic view showing another flow micro-adjusting stick of the present invention.

As shown in FIG. 4 being a sectional schematic view showing another flow micro-adjusting stick of the present invention, the flow micro-adjusting stick 12 is a hollow pipe with a channel therein, the flow micro-adjusting stick 12 is provided thereon with a series of holes 121 arranged sequentially and having their radii changed gradually; by displacement of the holes 121, change of flow results.

Figure 5:
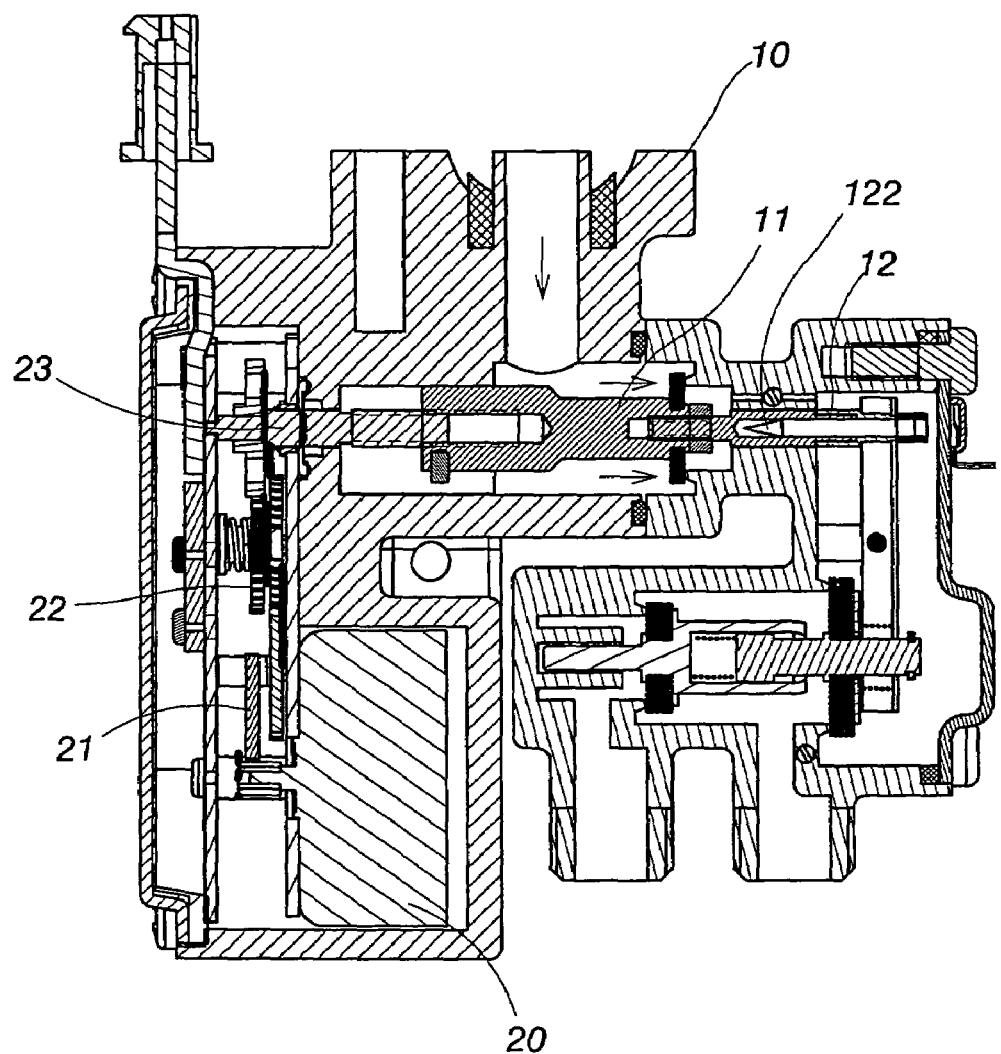
FIG. 5 is a sectional schematic view showing a further flow micro-adjusting stick of the present invention.

As shown in FIG. 5 being a sectional schematic view showing a further flow micro-adjusting stick of the present invention, the flow micro-adjusting stick 12 is a hollow pipe with a channel therein, the flow micro-adjusting stick 12 is provided thereon with a notch 122 having its width changed gradually; by displacement of the notch 122, change of flow results.

Figure 6:
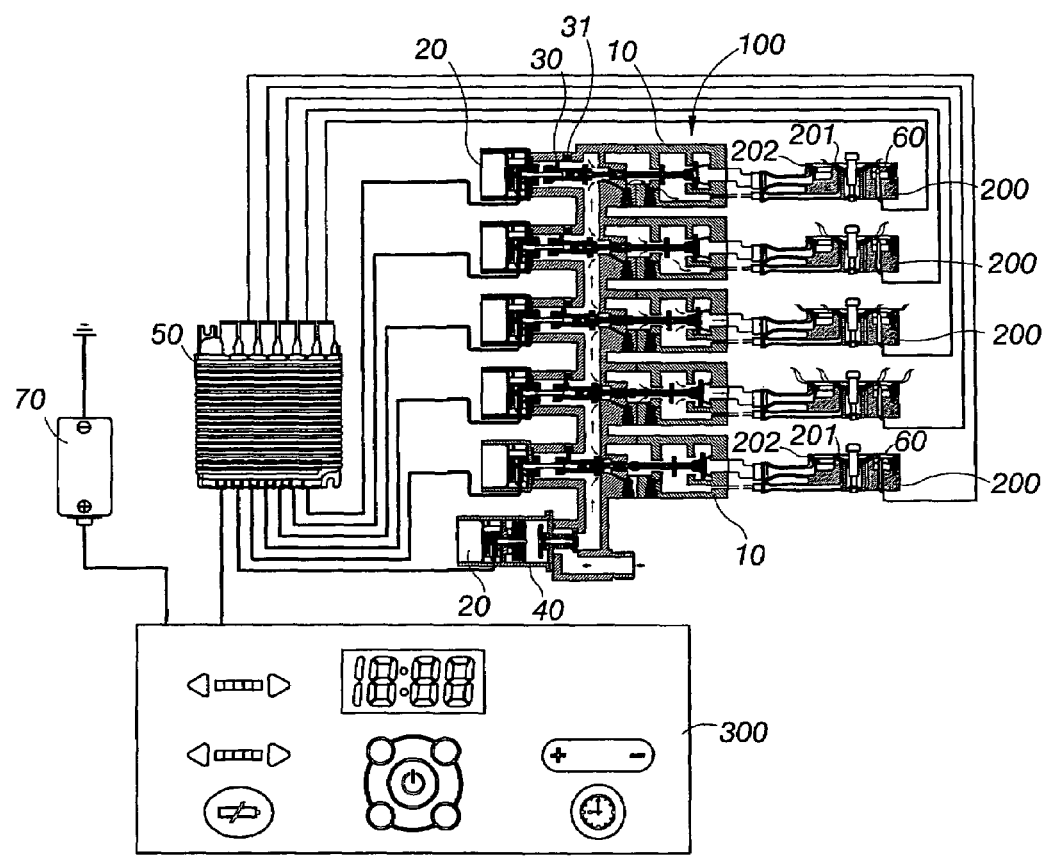
FIG. 6 a schematic view showing application of the present invention to a gas furnace with plural furnace units.

As shown in FIG. 6 being a schematic view showing application of the present invention to a gas furnace with plural furnace units 200, the flow adjusting mechanism 100 can simultaneously contain a plurality of flow adjusting valves 10 connecting parallelly and operating independently and cooperating respectively with the furnace units 200, the furnace units 200 can be designed to have an inner line of fire 201 and an outer line of fire 202 each; and a master valve 40 can be provided at an upstream end of these flow adjusting valves 10; the power of the master valve 40 is also provided by a D.C. low power motor.

In practicing, a control panel 300 can be used to present the state of operations of the gas furnace and provide settings for various operations for a user; the control system for the flow adjusting valve of the present invention can be used to integrate and control the flow adjusting valves 10, the master valve 40, the control panel 300 and an ignition box 50, an ignition and flame detecting needle 60 provided on the gas furnace, so that the gas furnace can be safer in use; when one of the flow adjusting valves 10 is out of order and unable to be closed, the master valve 40 can be closed to stop flowing of flow, such a technique is particularly applicable to combustors to prevent accident. And more, the present invention can have a feature of being low in electric consumption; thereby it can have a built-in dry battery 70 to directly provide electric power.

Figure 7:
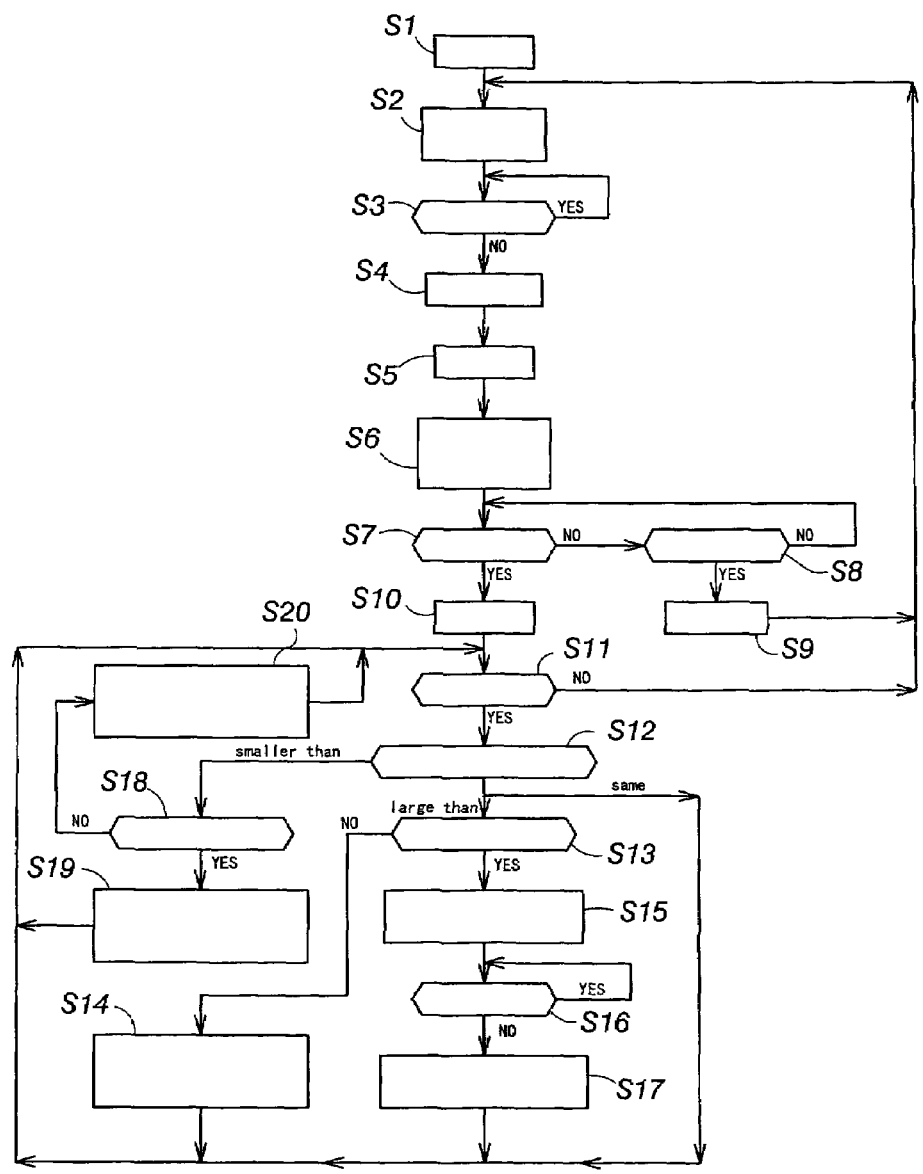
FIG. 7 is a process chart showing the actions when the present invention is used on a safety flow adjusting valve.

FIG. 7 is a process chart showing the actions of a safety flow adjusting valve, when the control system for the flow adjusting valve of the present invention is used on a combustor, adjusting of fire power can be performed by accurate control on gas supplying; by virtue that the area of the drawing of FIG. 7 is limited, partial content of the drawing is indicated only with designated codes, the content of the designated codes is listed as below:

N1: the position of pulse of the motor 20 before adjusting;

N: the position of pulse of the motor 20 presently;

B: the number of pulse (ordinary amount) after adjusting upwards for a grade or downwards for a grade of the motor 20;

C: the number of pulse of fire power after adjusting downwards for a grade at the largest fire power.

The main steps of operating of the safety flow adjusting valve is as below: after the control system for a flow adjusting valve is initially tried to be turned on electrically (step S1), the motor rotates forwards to shut the safety flow adjusting valve (S2), then detecting whether there are pulses (S3) is done, existing of pulses indicates that the flow adjusting valve has not been closed, at this time, the motor goes on rotating forwards.

When the step of detecting whether there are pulses (S3) results that there is no pulse, this means that the flow adjusting valve has been closed, the motor is commanded to stop rotating (S4), after that, the motor is turned on for ignition (S5), and the motor 20 is commanded to backwardly rotate, the fire power of the backwardly rotating pulse N is adjusted to be medium (S6), then the gas furnace is detected if there is a flame (S7), if there is no flame, a judgment of whether this is over-time ignition (S8) is done, the detection is continued if this is not over-time ignition, while ignition is stopped if this is over-time ignition (S9) and the process returns to the step of rotating forwards the motor so that the flow adjusting valve is shut (S2).

When the result of the step that the gas furnace is detected if there is a flame (S7) is decided that there is a flame, ignition is stopped (S10), now it is detected whether there is a flame (S11), if there is none, the process returns to the step of rotating forwards the motor so that the flow adjusting valve is shut (S2).

If there is a flame when it is detected whether there is a flame (S11), comparison of the set fire power with the present fire power (S12) is done, if the set fire power is same as the present fire power, the process returns to the step of detecting whether there is a flame (S11) to thereby perform continual circulating detection.

When the comparison of the set fire power with the present fire power (S12) results that the set fire power is larger than the present fire power, a judgment is done to know whether the fire power is set to be the maximum fire power (S13), if it is set not to be the maximum fire power, a step that the fire power is adjusted upwards for a grade, the motor is rotated backwards (counting the number of the pulses B) and the present position of pulse of the motor is made N=N1+B (S14) is executed, then the process returns to the step of detecting whether there is a flame (S11) to thereby perform continual circulating detection.

If the step to know whether the fire power is set to be the maximum fire power (S13) results that the fire power is set to be the maximum fire power, a step that the fire power is adjusted upwards for a grade and the motor is rotated backwards to count pulses (S15) is executed, then the process proceeds to the step of detecting whether there are pulses (S16), the detection for pulses is continued if there are pulses, a step of counting the number of the pulses C and the present position of pulse of the motor is made N=N1+C is executed (S17), then the process returns to the step of detecting whether there is a flame (S11) to thereby perform continual circulating detection.

When the set fire power is smaller than the present fire power in the step of comparison of the set fire power with the present firepower (S12), a step to know whether it is the maximum fire power presently (S18) is done; if it is, a step that the fire power is adjusted downwards for a grade, the motor is rotated forwards (counting the number of the pulses C) and the present position of pulse of the motor is made N=N1−C (S19) is executed, then the process returns to the step of detecting whether there is a flame (S11) to thereby perform continual circulating detection.

If the step to know whether it is the maximum fire power presently (S18) results that it is not, a step that the fire power is adjusted downwards for a grade, the motor is rotated forwards (counting the number of the pulses B) and the present position of pulse of the motor is made N=N1−B (S20) is executed, then the process returns to the step of detecting whether there is a flame (S11) to thereby perform continual circulating detection.

The preferred embodiment shown and described is only for illustrating the present invention, and not for giving any limitation to the scope of the present invention; it will be apparent to those skilled in this art that various equivalent modifications or changes without departing from the spirit of this invention shall also fall within the scope of the appended claims.

The invention claimed is:

1. A control system for a flow adjusting valve, said control system acts on a flow adjusting mechanism to change openness of said flow adjusting valve in said flow adjusting mechanism and to get an effect of flow adjusting; said control system is characterized in that:
   said control system for said flow adjusting valve uses rotation of a low power motor as a power force to get said openness of said flow adjusting mechanism; rotating of said motor is transmitted via a plurality of transmission gears and clutch gears to a terminal output axle, then said terminal output axle drives said flow adjusting valve to change openness of the latter; said control system for said flow adjusting valve further includes a magnet synchronically rotating with said terminal output axle and a magnetic inductive element in opposition to said magnet to count number of rotating turns of said terminal output axle to obtain different fed back signals, thus openness of said flow adjusting valve is known; at the maximum and the minimum states of openness of said flow adjusting valve, said terminal output axle is unable to further rotate, said clutch gears generate a protective getting off action to render said magnetic inductive element unable to detect said fed back signals; said maximum and minimum states of openness of said flow adjusting valve is known by rotating forwards and backwards of said motor, this is used as a reference method to have frequency signals of said control system for said flow adjusting valve set zero for correction.

2. The control system for a flow adjusting valve as in claim 1, wherein said flow adjusting valve further includes a valve plugging set driven by said terminal output axle to move linearly, openness of said flow adjusting mechanism is changed by linear movement of said valve plugging set; said minimum state of openness of said flow adjusting valve means a state in which said valve plugging set seals said valve port provided for said flow adjusting valve.

3. The control system for a flow adjusting valve as in claim 2, wherein said valve plugging set further includes a flow micro-adjusting stick to cooperate with a minimum flow through hole provided in said flow adjusting valve, said flow micro-adjusting stick moves to and fro in said minimum flow through hole when said valve plugging set moves linearly, said flow micro-adjusting stick is provided thereon with different flowing through sections in order that different flow supplying effects are provided when said flow micro-adjusting stick is moved in said minimum flow through hole, and this is the character of said valve plugging set.

4. The control system for a flow adjusting valve as in claim 3, wherein said flow micro-adjusting stick is a cone.

5. The control system for a flow adjusting valve as in claim 3, wherein said flow micro-adjusting stick is a cylinder with a stepped variation.

6. The control system for a flow adjusting valve as in claim 3, wherein said flow micro-adjusting stick is a hollow pipe with a channel therein, said flow micro-adjusting stick is provided thereon with a series of holes arranged sequentially and having their radii changed gradually.

7. The control system for a flow adjusting valve as in claim 3, wherein said flow micro-adjusting stick is a hollow pipe with a channel therein, said flow micro-adjusting stick is provided thereon with a notch having its width changed gradually; by displacement of said notch, change of flow results.

8. The control system for a flow adjusting valve as in claim 2, wherein said flow adjusting valve further includes a main valve port and a slow opening port, while said valve plugging set is provided thereon with a main valve plug and a slow valve plug respectively in cooperation with said main valve port and said slow opening port; when said main valve port is opened to a preset openness as said valve plugging set moves linearly, said slow valve plug opens to make said slow opening port open.

9. The control system for a flow adjusting valve as in claim 1, wherein said flow adjusting mechanism simultaneously contains a plurality of flow adjusting valves connecting parallelly and operating independently as well as a master valve provided at an upstream end of said flow adjusting valves; said master valve also uses rotation of said motor as its power force.

* * * * *